(12) United States Patent
Badri et al.

(10) Patent No.: US 9,482,087 B2
(45) Date of Patent: Nov. 1, 2016

(54) GEOMECHANICAL LOGGING TOOL

(71) Applicant: SCHLUMBERGER TECHNOLOGY CORPORATION, Sugar Land, TX (US)

(72) Inventors: Mohammed Badri, Al-Khobar (SA); Reza Taherian, Al-Khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 181 days.

(21) Appl. No.: 13/857,620

(22) Filed: Apr. 5, 2013

(65) Prior Publication Data
US 2013/0269931 A1 Oct. 17, 2013

Related U.S. Application Data

(60) Provisional application No. 61/623,646, filed on Apr. 13, 2012.

(51) Int. Cl.
*E21B 49/00* (2006.01)
*G01V 9/00* (2006.01)
*G01V 11/00* (2006.01)

(52) U.S. Cl.
CPC ............... *E21B 49/00* (2013.01); *G01V 9/00* (2013.01); *G01V 11/005* (2013.01)

(58) Field of Classification Search
USPC .......... 166/250.01, 254.2; 73/152.01–152.62
See application file for complete search history.

(56) References Cited

U.S. PATENT DOCUMENTS

| 5,165,274 | A | * | 11/1992 | Thiercelin | E21B 49/006 73/152.59 |
|---|---|---|---|---|---|
| 5,912,459 | A | | 6/1999 | Mullins et al. | |
| 6,164,126 | A | | 12/2000 | Ciglenec et al. | |
| 7,669,668 | B2 | | 3/2010 | Martinez et al. | |
| 2005/0257630 | A1 | * | 11/2005 | Gilbert et al. | 73/863.84 |
| 2006/0113111 | A1 | * | 6/2006 | Martinez et al. | 175/45 |
| 2006/0117842 | A1 | | 6/2006 | Ramakrishnan | |
| 2006/0284975 | A1 | * | 12/2006 | Clark et al. | 348/85 |
| 2007/0056795 | A1 | * | 3/2007 | Cox | G01V 1/52 181/111 |
| 2011/0172922 | A1 | * | 7/2011 | Evans et al. | 702/8 |

FOREIGN PATENT DOCUMENTS

WO 2009086279 7/2009

OTHER PUBLICATIONS

Richard et al., "SPE/ISRM 47196: The scratch test as a means to measure strength of sedimentary rocks," SPE International, 1998: pp. 15-22.
International Search Report and Written Opinion of PCT Application No. PCT/US2013/035554 dated Jul. 25, 2013: pp. 1-11.

* cited by examiner

*Primary Examiner* — Taras P Bemko
(74) *Attorney, Agent, or Firm* — Jakub Michna; Bridget M. Laffey

(57) ABSTRACT

An apparatus including a body having a central axis defined therethrough, at least one extendable arm coupled to the body, and a mechanical property tester coupled to the at least one extendable arm, the mechanical property tester configured to penetrate a surface of a borehole and to measure one or more mechanical properties of the surface of the borehole.

26 Claims, 7 Drawing Sheets

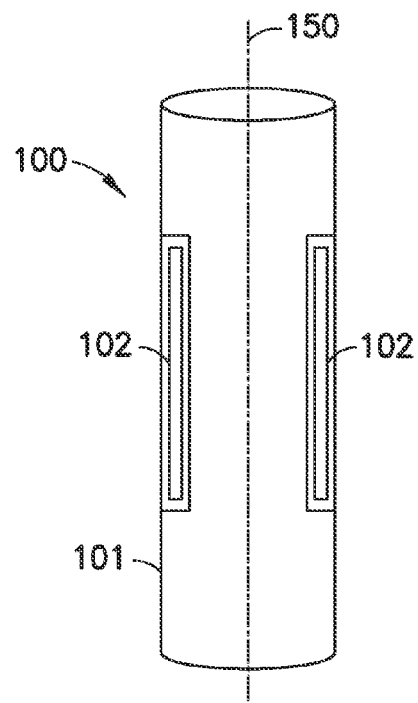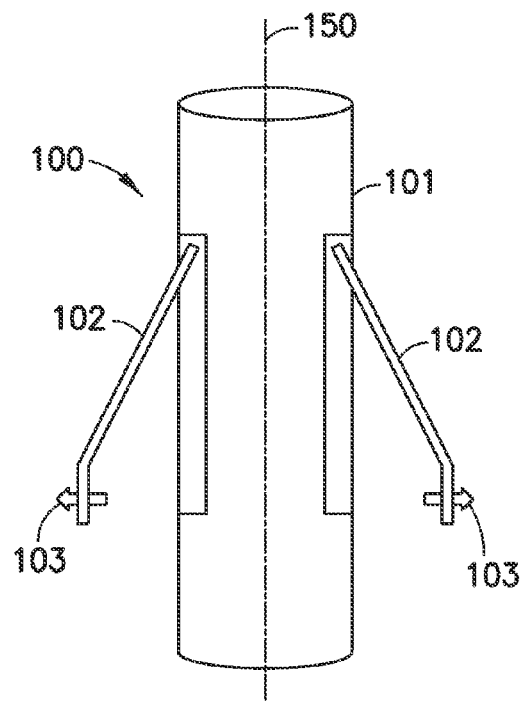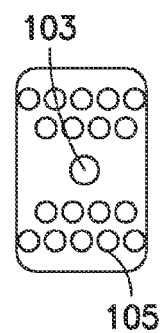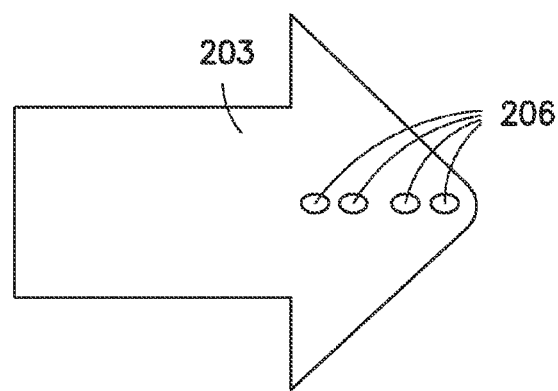

GEOMECHANICAL LOGGING TOOL

CROSS-REFERENCE TO RELATED APPLICATIONS

This application claims the benefit under 35 U.S.C. §119 (e) of U.S. Provisional Patent Application Ser. No. 61/623, 646, filed Apr. 13, 2012, which is hereby incorporated by reference in its entirety.

BACKGROUND

The collection of data on downhole conditions and movement of the drilling assembly during the drilling operation is referred to as measurement-while-drilling ("MWD") techniques. Similar techniques focusing more on the measurement of formation parameters than on movement of the drilling assembly are referred to as logging-while-drilling ("LWD") techniques. The terms "MWD" and "LWD" are often used interchangeably to refer to the collection of formation and borehole information, as well as of data on movement of the drilling assembly.

Measurements of the subject borehole are important in the measurement of the parameters of the formation being penetrated and in the drilling of the borehole itself. Specifically, measurements of borehole shape and size are useful in a number of logging or measurement applications.

SUMMARY

According to one aspect of the present disclosure, there is provided an apparatus including a body having a central axis defined therethrough, at least one extendable arm coupled to the body, and a mechanical property tester coupled to the at least one extendable arm, the mechanical property tester configured to penetrate a surface of a borehole and to measure one or more mechanical properties of the surface of the borehole.

According to another aspect, there is provided a method including disposing a measurement tool within a borehole, extending a mechanical property tester of the measurement tool toward a surface of the borehole, penetrating the surface of the borehole with the mechanical property tester, and measuring one or more mechanical properties of the surface of the borehole.

Other aspects and advantages of the present disclosure will be apparent from the following description and the appended claims. The various characteristics described above, as well as other features, will be readily apparent to those skilled in the art upon reading the following detailed description, and by referring to the accompanying drawings.

BRIEF DESCRIPTION OF DRAWINGS

FIG. 1A is a side view of a measurement tool in a retracted position in accordance with embodiments disclosed herein.

FIG. 1B is a side view of the measurement tool of FIG. 1A in an extended position in accordance with embodiments disclosed herein.

FIG. 1C is a close-up top view of the mechanical property tester of FIG. 1B and a plurality of electrodes in accordance with embodiments disclosed herein.

FIG. 2 is a schematic diagram of a mechanical property tester having a plurality of transducers disposed thereon in accordance with embodiments disclosed herein.

DETAILED DESCRIPTION

Figure 3A:
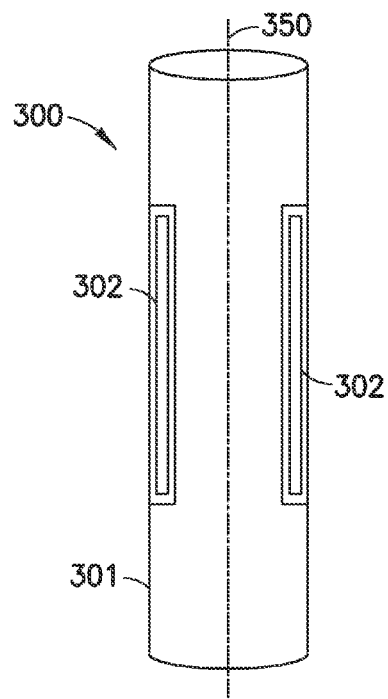
FIG. 3A is a side view of a measurement tool in a retracted position in accordance with embodiments disclosed herein.

The following is directed to various embodiments of the disclosure. Although one or more of these embodiments may be preferred, the embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice. Further, like reference numbers and designations in the various drawings indicate like elements.

Certain terms are used throughout the following description and claims to refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component is coupled to a second component, that connection may be through a direct connection, or through an indirect connection via other components, devices, and connections. Further, the terms "axial" and "axially" generally mean along or parallel to a central or longitudinal axis, while the terms "radial" and "radially" generally mean perpendicular to a central longitudinal axis.

Additionally, directional terms, such as "above," "below," "upper," "lower," etc., are used for convenience in referring to the accompanying drawings. In general, "above," "upper," "upward," and similar terms refer to a direction toward the earth's surface from below the surface along a borehole, and "below," "lower," "downward," and similar terms refer to a direction away from the surface along the borehole, i.e., into the borehole, but is meant for illustrative purposes only, and the terms are not meant to limit the disclosure.

The present disclosure relates generally to the field of oil and gas exploration. More particularly, the present disclosure relates to apparatuses and methods for determining at least one property of a subsurface formation penetrated by a borehole using a formation tester.

Mechanical properties of rock formations play an important role in many aspects of managing a well, including fracture initiation and control, completion, and wellbore stability, to name a few.

In one or more embodiments, a geomechanical measurement tool is disclosed. In one or more embodiments, the geomechanical measurement tool may be a measurement apparatus that measures mechanical properties of a formation. In non-limiting examples these mechanical properties may be measured while drilling, shortly after drilling (e.g., while tripping into and/or out of the hole) or at a later time (e.g., via wireline, coil tubing, or any other conveyance methods known in the art).

In one or more embodiments, the apparatus may include a body having a central axis defined therethrough, at least one extendable arm coupled to the body, and at least one mechanical property tester that may be used to cut/penetrate (e.g., scratch) the formation rock the extent of penetration and/or the force needed to make an indentation in the formation is measured. In other words, the mechanical property tester may be configured to penetrate a surface of the formation and to measure one or more mechanical properties of the formation. In one or more embodiments, the at least one mechanical property tester may be a mechanical scratcher. The at least one extendable arm may be used to map the shape of the wellbore (e.g., the shape of the perimeter of the borehole) thereby providing more mechanical information. In one or more embodiments, the at least one extendable arm may be a caliper arm and may be spring loaded. In one or more embodiments, the apparatus may include an imaging tool which may be used to map a face (i.e., a surface) of the formation and/or the formation extending beyond the face. Further, in one or more embodiments, the apparatus may make measurements continuously or in one or more stations, which may be located proximate to other stations.

Further, in one or more embodiments, a measuring while tripping tool is disclosed. In one or more embodiments, the measuring while tripping tool may be a measurement apparatus that may be used for providing imaging, caliper information and/or geomechanical information while tripping and may make measurements of the formation while a BHA is pulled out of the borehole. Non-limiting examples of geomechanical information includes compressional and shear stress information about the formation.

In one or more embodiments, the mechanical property tester may be a mechanical scratcher having a rod with a sharp end that may be forced into a rock formation (i.e., into a surface of a borehole) to create an indentation. The force needed to create an indentation with a predetermined depth may be directly proportional to the mechanical strength of the formation. As an object, such as a ball or a cone, is pressed into a surface, it penetrates the material and creates an indentation. In the field of mechanical testing these measurements lead to an index called "hardness." The index may be calculated using the Rockwell scale, the Brinell scale or similar tests. Hardness of a material to deformation may be related to the microdurability of the material which is related to micro scale shear modulus in all directions. Hardness may also be related to the size of particles making up the material. Hardness may also be inversely proportional to the particle size, a dependence that is referred to as a Hall-Petch relation. In the case of a rock, the particles are called grains and measurement of the hardness can provide information on the grain size. The relation between yield stress and grain size may be described mathematically by the Hall-Petch equation:

$$\sigma_y = \sigma_0 + \frac{k_y}{\sqrt{d}}$$

In one or more embodiments, $\sigma_y$ is the yield stress, which can be derived from the hardness, $\sigma_0$ is a materials constant for the starting stress for dislocation movement (or the resistance of the lattice to dislocation motion), $k_y$ is the strengthening coefficient (a constant unique to each material), and d is the average grain diameter. Hardness has other applications in the oil field. For example, the relationship between hardness and the length of time when a proppant is in a fracture helps keep the fracture open and fluid conductivity intact. When a fracture is formed, there are stresses present that tend to close the fracture. The oil industry uses small size particles as proppants. These particles form a bridge between the two faces of a facture and may prevent it from closing. This may be equivalent to pressing the proppant into the rock body and if the rock is too soft the proppant may form an indent and may embed into the formation leading the fracture to close. The size and properties of proppants can be adjusted based on the rock hardness. Thus, knowing the rock hardness may be important before fracturing the formation.

One or more embodiments of the present disclosure measures hardness of a formation downhole. By pressing a tester into the rock formation, the hardness is measured, which is related to uni-axial compressive strength with the axis being perpendicular to the borehole wall. Alternatively, a probe, while in the indentation, is dragged along the length of the borehole thereby measuring another uni-axial compressive strength with the axis being along the length of the borehole. As discussed above, the hardness may also be related to the grain size. Laboratory studies have shown the data from scratch test can be used to determine uni-axial compressive strength, elastic modulus and rock strength (see for example, Richard et al., SPE 47196, 1998.) These parameters derived from the measurement results of this invention may also be used to determine rock heterogeneity.

Referring to FIGS. 1A-1C, side views of a measurement tool 100, in accordance with embodiments disclosed herein, are shown. In one or more embodiments, the measurement tool 100 may include a body 101 having a central axis 150 defined therethrough, and at least one extendable arm 102. In one or more embodiments, the at least one extendable arm 102 of the measurement tool 100 may be movable between a retracted position and an extended position. Those having ordinary skill in the art will appreciate that the measurement tool 100 may include one, two, three, four, or more extendable arms 102 and is not necessarily limited to having two extendable arms, as shown.

As shown in FIG. 1A, the measurement tool 100 is in a retracted position, in which the extendable arms 102 are retracted into and/or against the body 101. In one or more embodiments, when the measurement tool 100 is in the retracted position, the extendable arms 102 may be positioned as close to the central axis 150 of the body 101 of the measurement tool 100 as possible.

As shown in FIG. 1B, the measurement tool 100 is in an extended position, in which the extendable arms 102 are extended away from the body 101 and away from the central axis 150 of the body 101. In one or more embodiments, when the measurement tool 100 is in the extended position, the extendable arms 102 may be positioned as far away from the central axis 150 of the body 101 of the measurement tool 100 as possible. Those having ordinary skill in the art will appreciate that the measurement tool 100 may also be movable to an intermediate position, in which the extendable arms 102 are positioned in any position between the retracted position and the extended position.

In one or more embodiments, the measurement tool 100 may include at least one mechanical property tester 103. As shown in FIG. 1B, the mechanical property testers 103 may be coupled to each of the extendable arms 102. In one or more embodiments, the mechanical property testers 103 may be mechanical scratchers and may be configured to penetrate a surface of a formation (not shown) and to measure one or more properties of the formation.

In downhole applications, the mechanical property testers 103 may be touching a wall of the borehole/surface of the formation. This may be accomplished with the extendable arms 102 that may be spring loaded and may extend against or contract from the surface of the formation, which may be a function of the diameter of the borehole. The extendable arms 102 may act as calipers when the extendable arms 102 are designed to touch the wall of the borehole. In such cases, the distances the extendable arms 102 have extended from the body 101 may be measured and recorded and may provide dimensions of the borehole. In one or more embodiments, the extendable arms 102 coupled with the mechanical property testers 103 may be used to determine the angular variation of geomechanical properties along the circumference of the borehole wall. In one or more embodiments, the extendable arms 102 provide data to map the shape of the borehole. The shape of the borehole may be an indication of other geomechanical properties of the borehole. Those having ordinary skill in the art will appreciate that the measurement tool 100 may include one, two, three, four, or more mechanical property testers 103 and is not necessarily limited to having two mechanical property testers, as shown.

However, those having ordinary skill in the art will appreciate that the measurement tool 100, according to embodiments disclosed herein, is not necessarily limited to including extendable arms (e.g., the extendable arms 102). In one or more embodiments, the mechanical property testers 103 may extend directly from the body 101 to penetrate the surface of the formation. For example, in one or more embodiments, the mechanical property testers 103 may extend radially from the body 101 of the measurement tool 100, without the use of extendable arms, to penetrate the surface of the formation.

In one or more embodiments, the mechanical tester 103 may be coupled to at least one of the extendable arms 102 via a joint (not shown). The joint can be adjusted to change the orientation of the mechanical tester 103 relative to the extendable arm 102. Thus, in one or more embodiments, the joint may be adjusted to change the orientation of the mechanical tester 102 relative to the formation. In some applications, the angle of the mechanical tester 102 is articulated, using the joint, such that the mechanical tester 102 is parallel to the borehole wall. The joint may be articulated when measurements in the radial direction is desired.

Further, in one or more embodiments, an imaging tool may be coupled to the body 101 of the measurement tool 100, in which the imaging tool is configured to map a surface of the formation. In one or more embodiments, the imaging tool may include a pad (not shown) coupled to the mechanical property testers 103 and/or coupled to the extendable arms 102, the pad including one or more imaging sensors such as, for example, resistivity measuring electrodes, ultrasonic transducers, dielectric sensors, or gamma ray detectors. In one or more embodiments, the pad may be a portion of the mechanical property testers 103 and/or a portion of the extendable arms 102 on which one or more imaging sensors may be disposed.

Referring to FIG. 1C, a close-up top view of the mechanical property tester 103 and a plurality of electrodes 105, in accordance with embodiments disclosed herein, is shown. In one or more embodiments, the plurality of electrodes 105 may be configured to measure resistivity of the formation (i.e., of a surface of the borehole). The plurality of electrodes 105 may be disposed on or around the mechanical property tester 103 to measure the resistivity of the region of the formation penetrated by the mechanical property tester 103. The measurement of resistivity of the formation may be used to map a surface of the borehole, and is an example of electrical information about the borehole that may be measured by the measurement tool 100. Those having ordinary skill in the art will appreciate that the one or more imaging tools that may be coupled to and used with the measurement tool 100 is not necessarily limited to the plurality of electrodes 105. For example, in one or more embodiments, the imaging tool may be any tool that may be used to map a surface of the borehole and may include one of an ultrasonic transducer, a gamma ray source and receiver, and a dielectric antenna.

Referring to FIG. 2, a schematic diagram of a mechanical property tester 203 having a plurality of transducers 206 disposed thereon, in accordance with embodiments disclosed herein, is shown. In one or more embodiments, the plurality of transducers 206 disposed on the mechanical property tester 203 may be configured to measure friction force between the mechanical property tester 203 and a formation (not shown). For example, as the mechanical tester 203 penetrates further into the rock formation, the signal from the plurality of transducers 206 may be used to determine the extent of penetration under the applied (known) force. In a rock with a lower compressive strength, the depth of penetration will be higher compared to a rock with higher compressive strength.

Further, in one or more embodiments, once the mechanical property tester 203 has penetrated the surface of the formation, the mechanical property tester 203 may be moved in a direction that is substantially perpendicular to the direction in which the mechanical property tester 203 was forced into the surface of the formation. In other words, once the mechanical property tester 203 has penetrated the surface of the formation, the mechanical property tester 203 may be moved in a direction that is substantially parallel to a central axis of a body of the measurement tool (e.g., parallel to the central axis 150 of the body 101 of FIG. 1B). The force (e.g., the frictional force) in this direction of movement may be measured and may be used to extract the shear strength of the rock formation. Further, the mechanical property tester may be used to measure a compressive strength of the formation, as discussed above. Although a tip of the mechanical property tester 203 may be relatively small, those having ordinary skill in the art will appreciate that microfabrication techniques may be used to force grow transducers (i.e., the plurality of transducers 206) on the tip of the mechanical property tester 203.

Figure 3B:
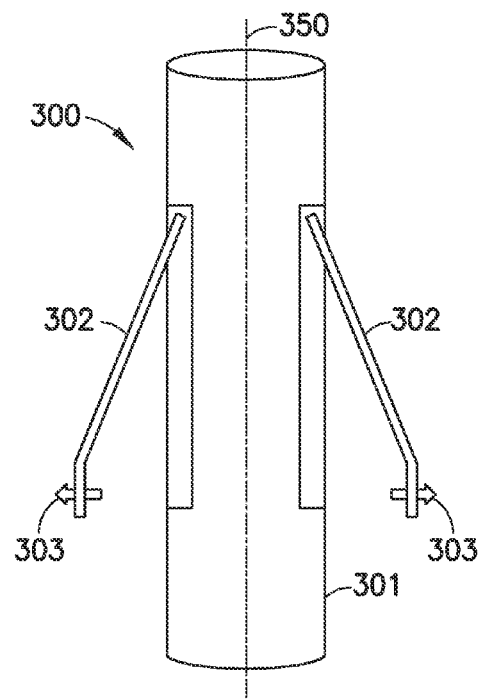
FIG. 3B is a side view of the measurement tool of FIG. 3A in an extended position in accordance with embodiments disclosed herein.

Referring to FIGS. 3A-3B, side views of a measurement tool 300, in accordance with embodiments disclosed herein, are shown. As discussed above, the measurement tool 300 may be movable between a retracted position and an extended position. As shown in FIG. 3A, when the measurement tool 300 is in the retracted position, extendable arms 302 may be retracted into and/or against a body 301 of the measurement tool 300. In one or more embodiments, when the measurement tool 300 is in the retracted position, the extendable arms 302 may be positioned as close to a central axis 350 of the body 301 of the measurement tool 300 as possible. As shown in FIG. 3B, when the measurement tool 300 is in the extended position, the extendable arms 302 may be extended away from the body 301 and away from the central axis 350 of the body 301. In one or more embodiments, when the measurement tool 300 is in the extended position, the extendable arms 302 may be positioned as far away from the central axis 350 of the body 301 of the measurement tool 300 as possible. Those having ordinary skill in the art will appreciate that the measurement tool 300 may also be movable to an intermediate position, in which the extendable arms 302 are positioned in any position between the retracted position and the extended position.

Figure 4A:
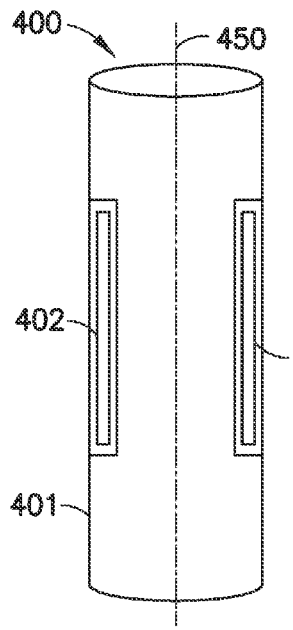
FIG. 4A is a side view of a measurement tool in a retracted position in accordance with embodiments disclosed herein.
Figure 4B:
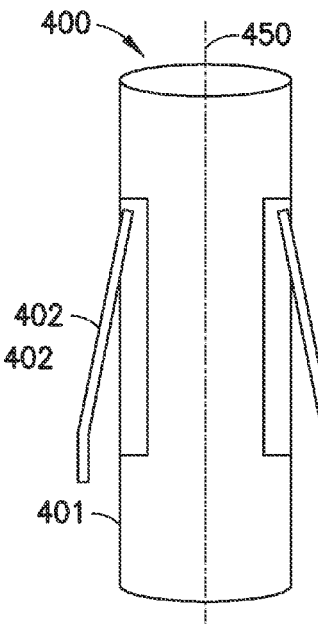
FIG. 4B is a side view of the measurement tool of FIG. 4A in an intermediate position in accordance with embodiments disclosed herein.
Figure 4C:
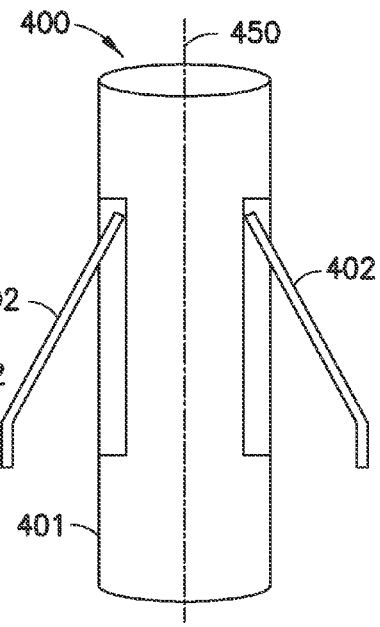
FIG. 4C is a side view of the measurement tool of FIG. 4A in an extended position in accordance with embodiments disclosed herein.

Referring to FIGS. 4A-4C, side views of a measurement tool 400, in accordance with embodiments disclosed herein, as shown. As shown, the measurement tool 400 includes a body 401 having a central axis 450 defined therethrough and extendable arms 402 coupled to the body 401, in which the extendable arms 402 are movable between a retracted position and an extended position. The measurement tool 400 is not limited to necessarily including one or more mechanical property testers (e.g., scratchers) (e.g., the mechanical property testers 303 of FIG. 3) coupled to the body 401 and/or to the extendable arms 402.

As shown in FIG. 4A, when the measurement tool 400 is in the refracted position, extendable arms 402 may be retracted into and/or against a body 401 of the measurement tool 400. In one or more embodiments, when the measurement tool 400 is in the retracted position, the extendable arms 402 may be positioned as close to a central axis 450 of the body 401 of the measurement tool 400 as possible. As shown in FIG. 4C, when the measurement tool 400 is in the extended position, the extendable arms 402 may be extended away from the body 401 and away from the central axis 450 of the body 401. In one or more embodiments, when the measurement tool 400 is in the extended position, the extendable arms 402 may be positioned as far away from the central axis 450 of the body 401 of the measurement tool 400 as possible. Those having ordinary skill in the art will appreciate that the measurement tool 400 may also be movable to an intermediate position, in which the extendable arms 402 are positioned in any position between the retracted position and the extended position. For example, as shown in FIG. 4B, the extendable arms 402 of the measurement tool 400 are positioned in an intermediate position, which may be between the retracted position shown in FIG. 4A and the extended position shown in FIG. 4C.

In one or more embodiments the amount of force exerted by the tool on the mechanical tester tip can be kept constant. For example a fixed spring may be used to push the arms in the direction of borehole wall. In this case, the position of extendable arms 402 may be adjusted relative to the body of the tool 400 depending on the size and dimensions of the borehole in order to maintain constant contact/engagement with the surface of the wellbore. In one or more embodiments, the extendable arms 402 may be retracted and extended along a length of the tool 400.

In one or more embodiments, the extendable arms 402 may be caliper arms and may act as calipers. For example, in one or more embodiments, the extendable arms 402 may be spring-loaded and configured to contact a surface of a formation. In other words, as the extendable arms 402 contact the surface of the formation, the extendable arms 402 may be configured to individually extend and/or contract to maintain contact with formation. The extent to which the extendable arms 402 extend or contract to maintain contact with the formation may be a function of the diameter of the borehole, and the distance each of the extendable arms 402 extends from the body 401 may be measured and recorded and may provide dimensions of the borehole. In one or more embodiments, the extendable arms 402 provide data to map the shape of the borehole, and the shape of the borehole may be an indication of other geometrical properties of the borehole. For example, an elliptical borehole may be used to determine the maximum (long axis) and minimum (short axis) direction of stress. This information may be useful for planning a fracturing operation or casing in the well. The shape of the borehole may also be used for other applications as is known to those in the art.

In one or more embodiments, the extendable arms 402 may also be telescoping arms such that the length of the extendable arms 402 may be made smaller for small diameter boreholes and the length of the extendable arms 402 may be made larger when the tool 400 is operating in a large diameter borehole. As a result, large diameter wells, washouts, and highly elongated wells may be measured. The irregular shape of the borehole may be an indication of the mechanical properties of the formation. Telescoping features of the extendable arms of the measurement tool, according to embodiments disclosed herein, are discussed further below in reference to FIG. 8.

In one or more embodiments, mechanical property testers (e.g., the mechanical property testers 303 of FIG. 3B) may be coupled to extendable caliper arms of a rotatable drilling assembly similar to the rotatable drilling assembly disclosed in co-owned U.S. Pat. No. 7,669,668, entitled "System, Apparatus, and Method of conducting Measurements of a borehole" (hereafter the '668 patent), which is incorporated by reference herein in its entirety. The extendable caliper arms may be used for while-drilling applications and adding the mechanical property testers to the extendable caliper arms may enable the caliper to perform as a geomechanical tool as well.

One or more embodiments of the present disclosure may also be used with wireline tools. Some wireline tools may be mounted on a pad, in non-limiting examples, dielectric tools and nuclear tools. In one or more embodiments, a pad may be provided with a mechanical property tester, which may be used to measure one or more mechanical properties (e.g., compressive strength and/or shear strength) of the formation while other measurements are being performed.

Further, in one or more embodiments, imaging tools, such as resistivity measuring electrodes, ultrasonic transducers, a gamma ray source and receiver, and a dielectric antenna, may also be coupled to the extendable caliper arms. Embodiments may also be used in existing or future imaging tools. For example, the wireline imaging tool (offered commercially by Schlumberger as FMI) which comprises four arms, and each arm may be equipped with a pad of resistivity measuring electrodes that are used to generate a high resolution image of the borehole wall. In this implementation, at least one of the FMI pads is equipped with a mechanical property tester (e.g., a scratcher) and may be used to measure the mechanical properties of the formation while the imaging operation is performed. This implementation may provide borehole wall images and geomechanical properties at the same depth.

The measurement tool according to embodiments disclosed herein, which may include imaging and caliper tools for while-drilling operations, may be subject to extreme torques and forces that may affect the reliability of the imaging and caliper tools and complicate the design of such tools. In one or more embodiments, the imaging and caliper operations may be completed during the tripping operation (i.e., while a drilling assembly and/or the measurement tool is being withdrawn from the wellbore). As a result, the measurement tool can be made much simpler and more versatile.

In one or more embodiments, a drill collar or sub of a drilling assembly may be equipped with at least one extendable arm, which may be a caliper arm. In other words, in one or more embodiments, the body 401 having the central axis 450 defined therethrough may be a drill collar having the central axis 450 defined therethrough. The extendable arm may be in a retracted position (e.g., the retracted position shown in FIG. 4A) during the drilling but may move to either an intermediate position or an extended position (e.g., the intermediate position shown in FIG. 4B or the extended position shown in FIG. 4C) while tripping and may obtain measurements as the Bottom-Hole-Assembly (BHA) is withdrawn from the wellbore. In one or more embodiments, a drill bit may be coupled to the drill collar, and both the drill bit and the drill collar may be part of the BHA.

Figures 5A, 5B:
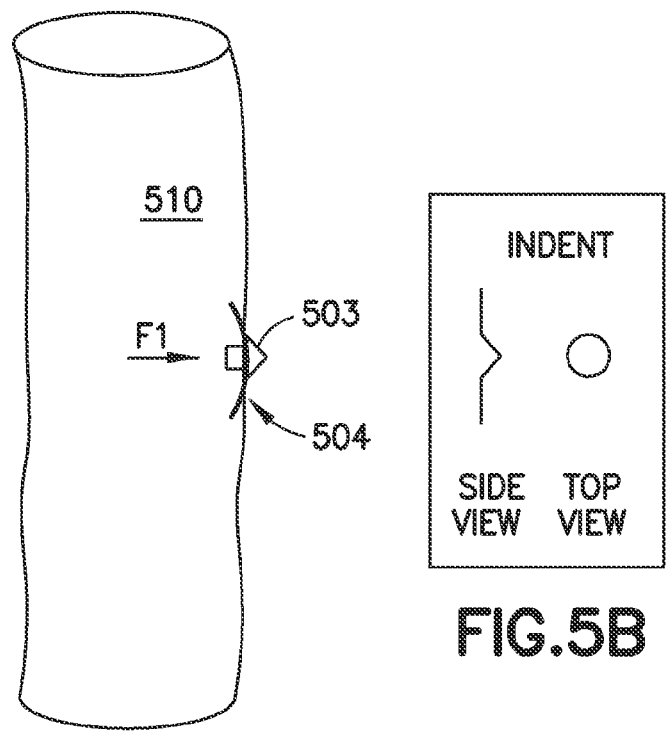
FIG. 5A is a schematic diagram of a mechanical property tester that has made a stationary penetration into a surface of a borehole in accordance with embodiments disclosed herein.
FIG. 5B is a side view and a top view of the stationary indent formed in the surface of the borehole by the mechanical property tester of FIG. 5A.

Referring to FIGS. 5A and 5B, a schematic diagram of a mechanical property tester 503 that has penetrated a formation in accordance with embodiments disclosed herein is shown. As shown, the mechanical property tester 503 has penetrated a wall of the borehole 510 (i.e., the formation), making a single indent shown in FIG. 5B. In one or more embodiments, the mechanical property tester 503 may be forced into the formation by a measurement apparatus (not shown). For example, in one or more embodiments, the mechanical property tester 503 may be coupled to an extendable arm (not shown) of the measurement apparatus which may extend radially from the measurement apparatus toward the wall of the borehole 510.

In one or more embodiments, the measurement apparatus may measure the amount of force needed to penetrate the formation with the mechanical property tester 503 to create an indentation (e.g., to a predetermined depth), which may provide geomechanical information about the formation. Because the direction of applied force may be perpendicular to the formation (e.g., the rock surface), this measurement may provide the compressive strength of the rock. In one or more embodiments, the mechanical property tester 503 may make a plurality of individual stationary penetrations (e.g., the single indent shown in FIG. 5B) along the surface of the borehole 510.

In one or more embodiments, the measurement tool may make continuous measurements along the surface of the borehole 510, and the mechanical property tester 503 may be applied with a constant force, and the depth of penetration of the mechanical property tester 503 into the surface of the borehole 510 can be measured and recorded. The depth of penetration of the mechanical property tester 503 into the surface of the borehole 510 may be related to the mechanical strength of the formation (e.g., compressive strength of the formation).

Further, as shown, a pad 504 may be coupled to the mechanical property tester 503. As discussed above, the pad 504 may include one or more resistivity measuring electrodes (e.g., the electrodes 105 of FIG. 1C). In one or more embodiments, the electrodes may be configured to measure resistivity of the formation (i.e., of a surface of the borehole 510). In other words, the electrodes may be used as an imaging tool, and the resistivity information about the formation attained by the electrodes may be used to map a surface of the formation. Those having ordinary skill in the art will appreciate that other imaging tools may be used, and the imaging tools disclosed herein are not necessarily limited to resistivity measuring electrodes. For example, in one or more embodiments, the imaging tools according to embodiments disclosed herein may include at least one of an ultrasonic transducer, a gamma ray source and receiver, and a dielectric antenna.

Figures 6A, 6B:
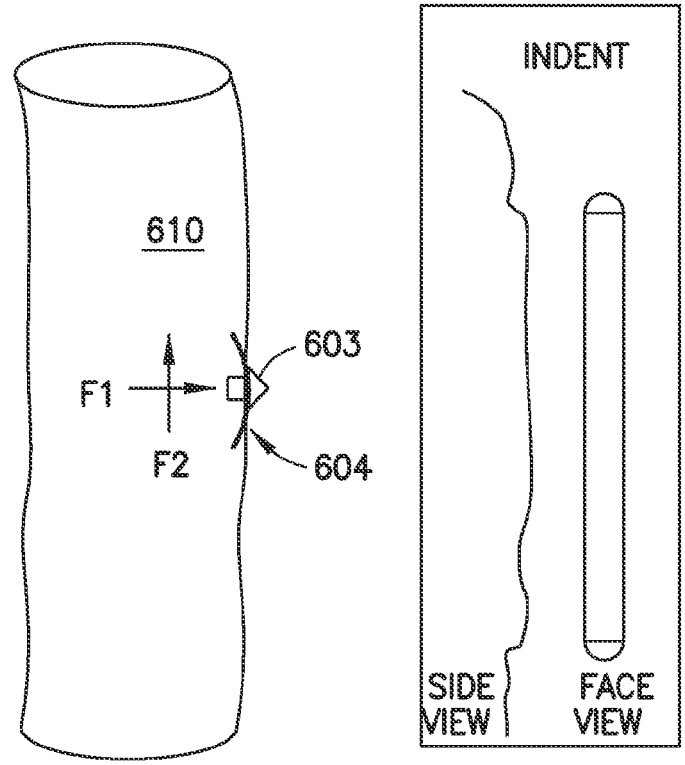
FIG. 6A is a schematic diagram of a mechanical property tester that has made a continuous penetration into a surface of a borehole in accordance with embodiments disclosed herein.
FIG. 6B is a side view and a top view of the continuous penetration into the surface of the borehole by the mechanical property tester of FIG. 6A.

Referring to FIGS. 6A and 6B, in one or more embodiments, a mechanical property tester 603 coupled to a measurement tool (not shown) may be used in a continuous mode and the mechanical property tester 603 may be applied to a wall of the borehole 610 while the measurement tool travels within the borehole 610. As shown in FIG. 6B, the result of using the mechanical property tester 603 in the continuous mode may not necessarily result in a circular indentation (e.g., as shown in FIG. 5B), but rather may result in a long deformation channel extending along the length of the borehole 610. The depth of indentation caused by a constant force may be measured or the force at each point may be adjusted to ensure the deformation has the same depth, and the applied force may be recorded. In other words, the force exerted onto the mechanical property tester 603 by the measurement tool may be adjusted as the mechanical property tester 603 has penetrated the surface of the borehole 610 to ensure that the depth of penetration by the mechanical property tester 603 is consistent along the length of the borehole 610. The measurement tool may record the applied force, which may provide measurements regarding the compressive strength of the formation face in the borehole 610. In one or more embodiments, the long deformation channel formed by the mechanical property tester 603 may be radial or helical in shape.

This mode of operation may provide a nearly continuous measurement of the mechanical properties of the borehole 610. The time response of the measurement tool in adjusting the force applied onto the mechanical property tester 603 may control the continuity of the measurement. There may also be interplay between the response time of the force applying mechanism of the measurement tool and the resolution of this measurement. In this continuous mode, the force (F1) applied perpendicular to the rock surface of the borehole 610 may be measured, similar to the measurements taken by the measurement tool in the station mode, and the compressive strength of the surface of the formation 610 may be determined. In addition, the force (F2), which is perpendicular to F1 and is in the direction of apparatus or tool movement, can be measured. The F2 force may be proportional to the shear strength of the surface of the borehole 610, as shown in FIGS. 6A and 6B.

In one or more embodiments, the measurement tool may make continuous measurements along the surface of the borehole 610, and the mechanical property tester 603 may be applied with a constant force, and the depth of penetration of the mechanical property tester 603 into the surface of the borehole 610 can be measured and recorded. The depth of penetration of the mechanical property tester 603 into the surface of the borehole 610 may be related to the mechanical strength of the formation (e.g., compressive strength of the formation). A shallow depth of penetration into the surface of the borehole 610 may be an indication that the formation is well consolidated. In this case, a plurality of transducers (e.g., the plurality of transducers 206 of FIG. 2) may be embedded into the mechanical property tester 603 and distributed along the length of the mechanical property tester 603. Transducers located in a part of a tip of the mechanical property tester 603 that has penetrated the rock matrix may measure a high friction force, while transducers located on a part of the tip of the mechanical property tester 603 that has not penetrated into the rock matrix may measure almost zero force.

Further, as shown, a pad 604 may be coupled to the mechanical property tester 603. As discussed above, the pad 604 may include one or more resistivity measuring electrodes (e.g., the electrodes 105 of FIG. 1C). In one or more embodiments, the electrodes may be configured to measure resistivity of the formation (i.e., of a surface of the borehole 610). In other words, the electrodes may be used as an imaging tool, and the resistivity information about the formation attained by the electrodes may be used to map a surface of the formation.

When the apparatus is used in the borehole 610, the rugosity of the surface of the borehole 610 may affect the measurement of the mechanical properties of the borehole 610, and the measurement apparatus may account for the rugosity of the borehole surface. In order to account for rugosity, when a mechanical property tester (e.g., the mechanical property tester 603) is applied to the rock surface of the borehole 610, a plot of applied force versus distance travelled can be used to distinguish the situation before the mechanical property tester reaches the surface from the situation where the mechanical property tester is actually forming an indentation in the formation.

Figure 7:
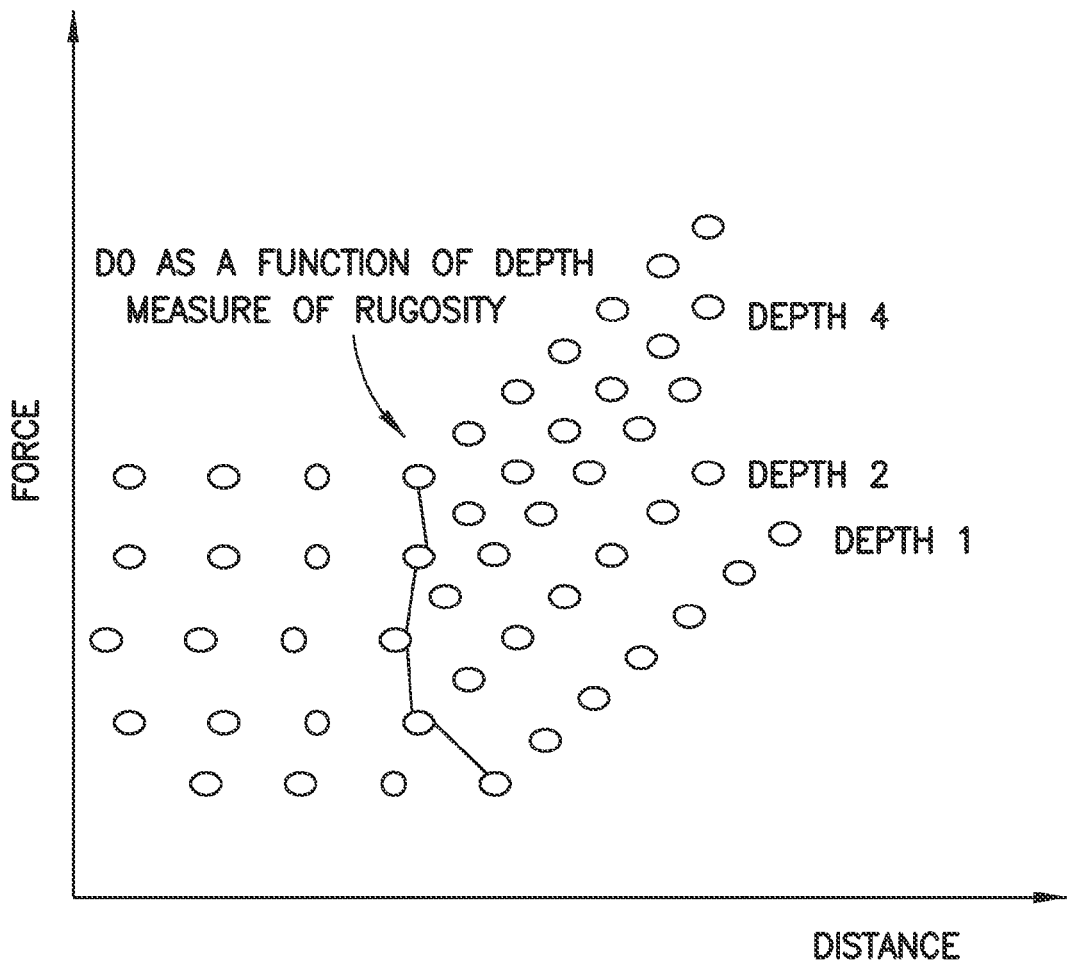
FIG. 7 is a plot of applied force versus the distance a mechanical property tester travels in accordance with embodiments disclosed herein.

FIG. 7 is a plot showing the applied force versus the distance for the scratcher or the head of a mechanical property tester (e.g., the mechanical property tester 603 of FIG. 6A). The initial situation prior to d0 represents the distance the mechanical property tester travels before reaching the rock surface. Knowing this distance may be useful in mapping the rugosity of the borehole wall. Geomechanical information is contained in the portion of the plot after d0 in FIG. 7, and the geomechanical information can be processed to determine formation properties.

According to another aspect of the present disclosure, there is provided a method including disposing a measurement tool within a borehole; extending a mechanical property tester of the measurement tool toward a surface of the borehole, penetrating the surface of the borehole with the mechanical property tester, and measuring one or more mechanical properties of the borehole. In one or more embodiments, the measurement tool includes at least one extendable arm coupled to a body of the measurement tool and coupled to the mechanical property tester, in which the at least one extendable arm is extendable radially away from the body. Further, in one or more embodiments, the measurement tool includes an imaging tool coupled to the body of the measurement tool. Measuring one or more mechanical properties of the borehole may include measuring one or more mechanical properties of the borehole with the imaging tool.

Referring back to FIGS. 1A-1C, the measurement tool 100 may include a body 101 at least one extendable arm 102, a mechanical property tester 103, and a plurality of electrodes 105 disposed on a pad, in which the pad is coupled to the mechanical property tester 103. In one or more embodiments, the at least one extendable arm 102 of the measurement tool 100 may be movable between a retracted position and an extended position. In one or more embodiments, the electrodes 105 may be an imaging tool used to map a surface of the borehole. However, those having ordinary skill in the art will appreciate that the one or more imaging tools that may be coupled to and used with the measurement tool 100 is not necessarily limited to the plurality of electrodes 105. For example, in one or more embodiments, the imaging tool may be any tool that may be used to map a surface of the borehole and may include one of an ultrasonic transducer, a gamma ray source and receiver, and a dielectric antenna.

According to one or more aspects of the present disclosure, measuring one or more mechanical properties of the borehole includes measuring a shape of the borehole using the at least one extendable arm.

Referring back to FIGS. 4A-4C, in one or more embodiments, the extendable arms 402 may act as calipers. For example, in one or more embodiments, the extendable arms 402 may be spring-loaded and configured to contact a surface of a borehole. In other words, as the extendable arms 402 contact the surface of the borehole, the extendable arms 402 may be configured to individually extend and/or contract to maintain contact with the surface of the borehole. The extent to which the extendable arms 402 extend or contract to maintain contact with the surface of the borehole may be a function of the diameter of the borehole, and the distance each of the extendable arms 402 extends from the body 401 may be measured and recorded and may provide dimensions of the borehole. In one or more embodiments, the extendable arms 402 provide data to map the shape of the borehole, and the shape of the borehole may be an indication of other geometrical properties of the borehole.

According to one or more aspects of the present disclosure, penetrating the surface of the borehole with the mechanical property tester includes a plurality of individual stationary penetrations along the surface of the borehole by the mechanical property tester.

Referring back to FIGS. 5A-5B, the mechanical property tester 503 has penetrated a wall of the borehole 510 (i.e., the formation), making a single indent. In one or more embodiments, the measurement apparatus may measure the amount of force needed to penetrate the formation with the mechanical property tester 503 to create an indentation (e.g., to a predetermined depth), which may provide geomechanical information about the formation. Because the direction of applied force may be perpendicular to the formation (e.g., the rock surface), this measurement may provide the compressive strength of the rock. In one or more embodiments, the mechanical property tester 503 may make a plurality of individual stationary penetrations (e.g., the single indent shown in FIG. 5B) along the surface of the borehole 510.

According to one or more aspects, penetrating the surface of the borehole with the mechanical property tester may include continuous contact between the mechanical property tester and the surface of the borehole for a predetermined period of time.

Referring back to FIGS. 6A-6B, the mechanical property tester 603 coupled to the measurement tool (not shown) is used in a continuous mode and the mechanical property tester 603 may be applied to a wall of the borehole 610 while the measurement tool travels within the borehole 610. The result of using the mechanical property tester 603 in the continuous mode may result in a long deformation channel extending along the length of the borehole 610, as shown in FIG. 6B. The force at each point may be adjusted to ensure the deformation has the same depth, and the applied force may be recorded. In other words, the force exerted onto the mechanical property tester 603 by the measurement tool may be adjusted as the mechanical property tester 603 has penetrated the surface of the borehole 610 to ensure that the depth of penetration by the mechanical property tester 603 is consistent along the length of the borehole 610. The measurement tool may record the applied force, which may provide measurements regarding the compressive strength of the formation along the axis of the borehole 610. In one or more other embodiments, the measurement tool may make continuous measurements along the surface of the borehole 610, and the mechanical property tester 603 may be applied with a constant force, and the depth of penetration of the mechanical property tester 603 into the surface of the borehole 610 can be measured and recorded. The depth of penetration of the mechanical property tester 603 into the surface of the borehole 610 may be related to the mechanical strength of the formation (e.g., compressive strength of the formation).

Figure 8:
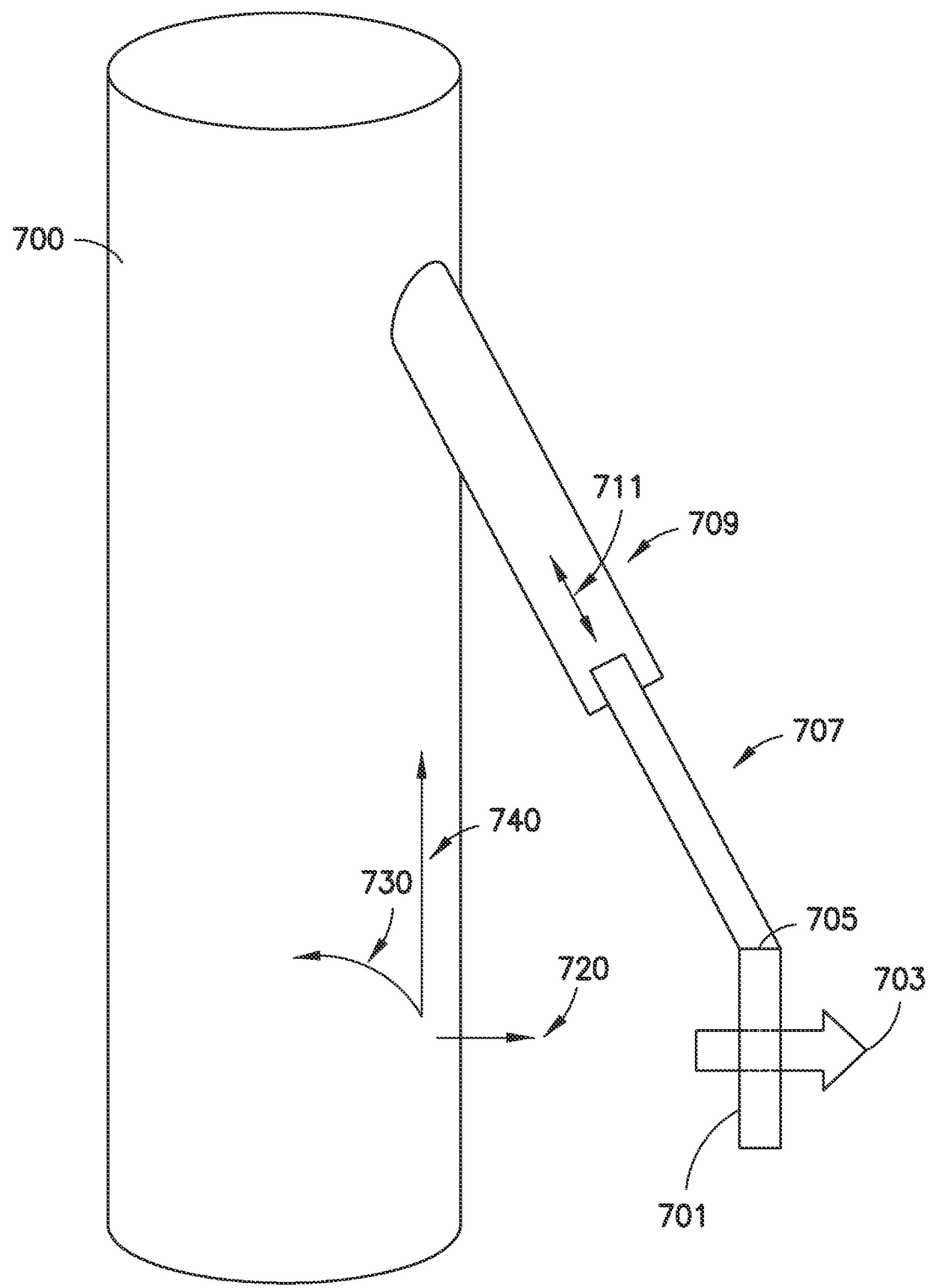
FIG. 8 is a side view of a measurement tool having telescoping, extendable arms in accordance with embodiments disclosed herein.

In one or more embodiments, measuring one or more mechanical properties of the borehole occurs during drilling of the borehole. In one or more embodiments, the mechanical properties of the borehole wall (formation) may be measured in three orthogonal directions. For example, the mechanical property tester 303 of FIG. 3 may be used to create an indent in the formation while the tool measures the force or the depth of the indentation. In this measurement a force is applied in the radial direction (i.e., in a direction along the radius 720 of the borehole, as shown in FIG. 8) and provides the mechanical properties of the formation along the radial direction. As such, this radial direction into the formation may be considered the first orthogonal direction.

During drilling conditions, the tool 300 can be part of a drill string or BHA and may be rotated. Thus, in one or more embodiments, the arm 302 may be extended and the mechanical tester 303 may scratch the surface of the borehole circumferentially (along 730), i.e. making an indentation with a depth and extending in a circular direction along the surface of the borehole. This circumferential direction along the surface of the borehole may be considered the second orthogonal direction.

As discussed above, the applied force by the extendable arm may be kept constant to form a variable depth of indentation (along with the constant force) determining the mechanical properties of the formation in the circumferential direction, or the force may be varied to form an indentation having a predetermined depth in which case the force at each point (and the constant indentation depth) determines the mechanical properties of the formation in the circumferential direction. The third orthogonal direction may be considered to be the direction along the length of the borehole, 740, which is described in reference to FIG. 6.

During drilling operations the apparatus 300 can be modified to perform this test, as shown in FIG. 8. The apparatus 700 is shown with at least one arm that can be extended to touch the borehole wall. The expandable arm may include a sleeve 709, an arm 707 and a pad 701. The pad 701 may contain the mechanical tester 703 and may be connected to the arm 707 via a joint 705. The joint 705 can be adjusted to change the orientation of the pad 703 relative to the arm 707. In some applications, the angle of pad 703 is articulated, using the joint 705, such that the pad 703 is parallel to the borehole wall. The joint 705 may be articulated when measurements in the radial direction is desired. The arm 707 may also slide in and out of the sleeve 709 to create motion in the axial direction. The sliding motion directions are shown by the arrow 711. When the mechanical tester 703 is in contact with the borehole wall, the arm 711 can be extended out of the sleeve 709 to cause a motion in the axial direction (downward) or it can slide into the sleeve 709 to cause a motion in the axial direction (upward). This motion may cause the indentation to scratch the surface of the borehole along its length creating an indentation similar to that shown in FIG. 6B. The axial mechanical property measurement may be performed by moving the mechanical tester 703 in an axial direction using the tool 700 during a drilling operation, which may cause the rotational motion of the tool 700 in the circumferential direction. The mechanical tester 703 may then trace the borehole wall in a helical fashion while making the measurement. The data in the helical path can be processed and separated into axial data and circumferential contributions. In one or more other embodiments, the measurement in the axial direction can be performed when the drill string is not rotating, which may occur, for example, when the rotation is stopped to add a new drill pipe to the drill string or when the drill string is lifted out of the hole (e.g., tripping).

Figure 9:
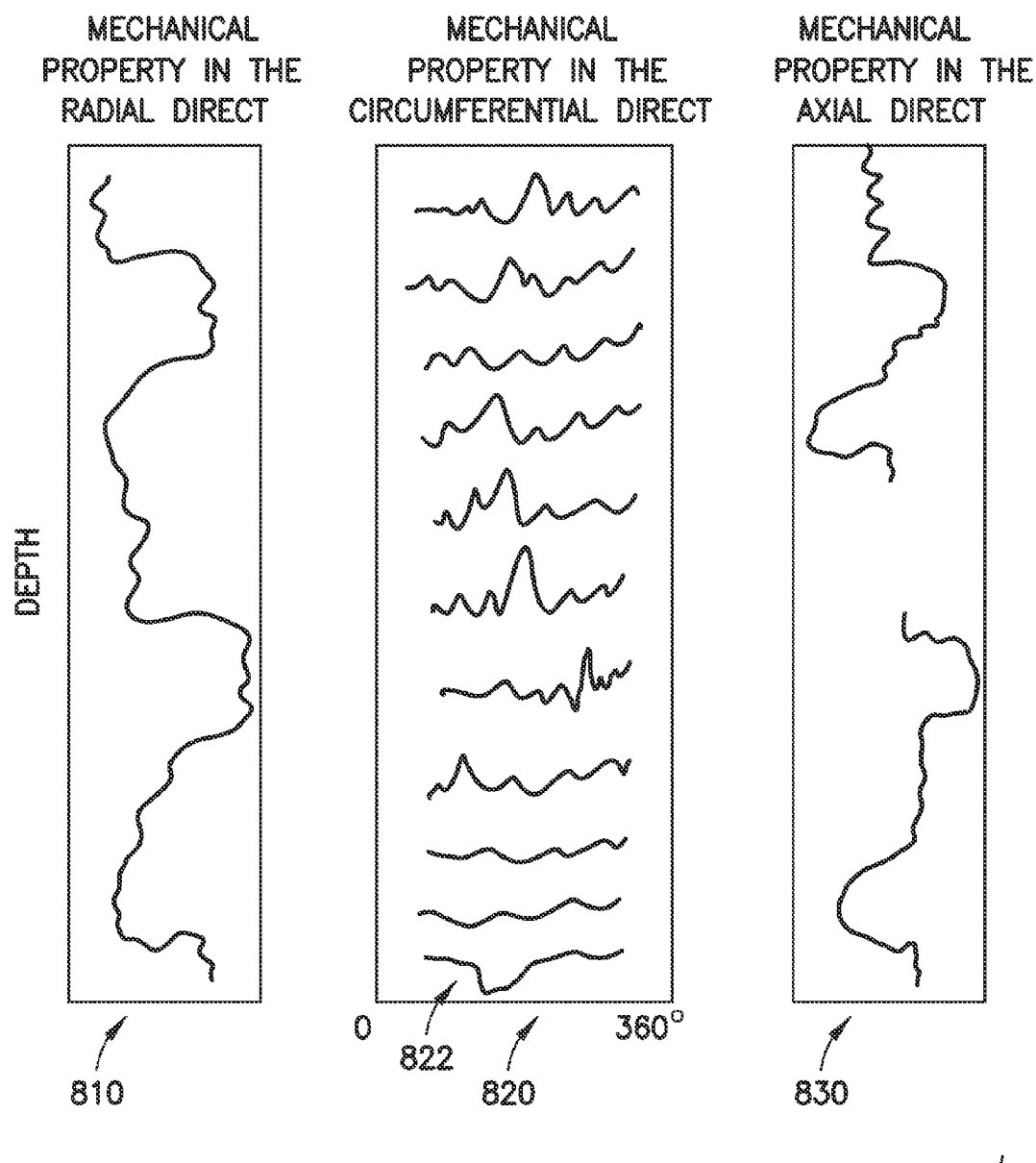
FIG. 9 shows plots of mechanical properties of a formation in accordance with embodiments disclosed herein.

Referring now to FIG. 9, the mechanical properties measured in the three orthogonal directions can be displayed in a log. The first track 810 is a plot of mechanical property in the radial direction which is either the depth of an indentation caused by a constant force or the force needed to make an indentation with fixed depth. Alternatively, the data can be transformed into other mechanical properties, such as the Rockwell index or compressive strength.

The second track 820 displays the mechanical properties (e.g., depth of indentation under constant force, variable force to make indentation with fixed depth, or the Rockwell index) in the circumferential direction. The horizontal axis in track 820 shows angles and ranges from 0 to 360 degrees in which 0 defined as a known (arbitrary) direction. Each curve 822 represents one rotation of the tool (or it can be from multiple rotations adjacent to each other and averaged to enhance signal to noise ratio for example). The curves 822 march down as the drill string penetrates deeper into the formation. Thus the vertical axis of track 820 shows depth within a borehole and also mechanical properties. The spacing between the curves 822 may be proportional to the rate of penetration of the drilling operation.

Similarly, the third track 830 displays the mechanical properties along the axial direction. In one or more embodiments, when data is missing in this track 830, the rate of penetration into the formation may be too fast. It is also possible to display the mechanical properties to form an image wherein the value of a mechanical property has been shown as a colored pixel on the image.

Figure 10:
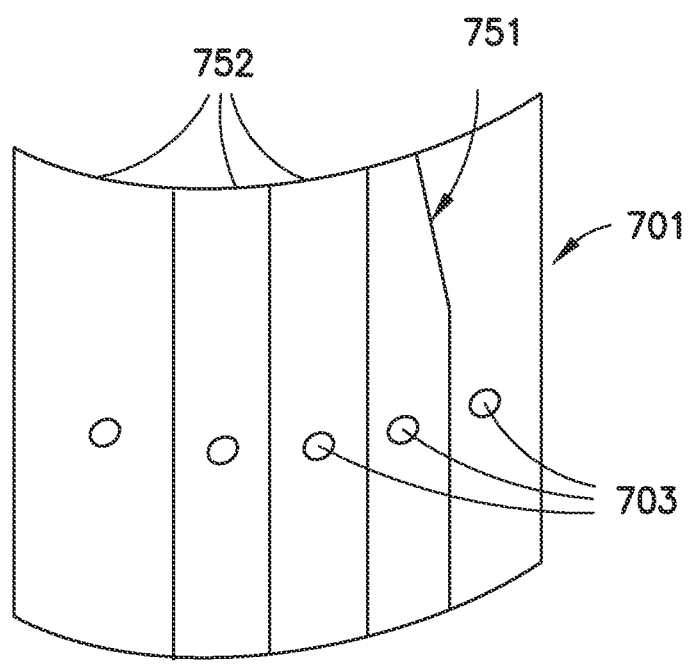
FIG. 10 is a perspective view of a pad having multiple mechanical testers in accordance with embodiments disclosed herein.

A wireline version of the mechanical tool (e.g., the tool 700 of FIG. 8) can make the same set of measurements along the axial and radial directions. However, the rotational motion of the tool, which was naturally present in while drilling operation, is missing. As a result, the wireline version of tool 700 should be designed to have a rotational motion to make circumferential measurements possible. In one or more embodiments, when complete circumferential coverage is not needed or lack of it can be tolerated, each of the pads 701 may be made to rotate a certain arc and not the entire circle. In one or more embodiments, when radial mechanical information is needed at more than one orientation, the pad 701 can be equipped with multiple mechanical testers 703, as shown in FIG. 10. In this case, the pad is divided into multiple sub pads 752 each having one or more mechanical tester 703 and each can be applied with a known force. This feature may counteract the possibility of the borehole not being circular. The multiple mechanical testers may make the corresponding number of indentations the depth of which may be related to the mechanical properties of the formation in the radial direction having different circumferential coordinates. The design of tools operating in wireline mode of deployment can also be used for the coil tubing mode of deployment.

In one or more other embodiments, measuring one or more mechanical properties of the borehole occurs after drilling the borehole. The method may also include retrieving the measurement tool from within the borehole, in which measuring one or more mechanical properties of the borehole occurs during the retrieving of the measurement tool from within the borehole.

As discussed above, the measurement tool according to embodiments disclosed herein, which may include imaging and caliper tools for while-drilling operations, in one or more embodiments, the imaging and caliper operations may be completed during the tripping operation (i.e., while a drilling assembly and/or the measurement tool is being withdrawn from the wellbore). According to one or more other aspects, the imaging and caliper operations may be performed while drilling.

Although only a few example embodiments have been described in detail above, those skilled in the art will readily appreciate that many modifications are possible in the example embodiments without materially departing from the subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An apparatus comprising:
    a body having a central axis defined therethrough;
    at least one extendable arm coupled to the body; and
    a geomechanical property tester having a plurality of transducers on a sharp tip of the geomechanical property tester wherein the geomechanical property tester is coupled to the at least one extendable arm, the geomechanical property tester configured to penetrate a surface of a borehole and to measure one or more geomechanical properties of the surface of the borehole; wherein the sharp tip of the geomechanical property tester is configured to be forced into the surface of the borehole to create an indentation.

2. The apparatus of claim 1, further comprising an imaging tool coupled to the body, wherein the imaging tool is configured to map a surface of the borehole.

3. The apparatus of claim 2, wherein the imaging tool comprises one of resistivity, an ultrasonic transducer, a gamma ray source and receiver, and a dielectric antenna.

4. The apparatus of claim 1, wherein a length of the at least one extendable arm is adjustable.

5. The apparatus of claim 1, wherein one of the plurality of transducers is configured to measure friction between the geomechanical property tester and the surface of the borehole.

6. The apparatus of claim 1, wherein the at least one extendable arm is a caliper arm configured to measure a shape of a borehole.

7. The apparatus of claim 1, wherein the at least one extendable arm is used to measure geomechanical properties of the surface of the borehole along at least one of the axial, circumferential, and radial directions of the borehole.

8. The apparatus of claim 1, wherein the one or more geomechanical properties of the surface of the borehole includes at least one of Rockwell Hardness, shear, elastic modulus, and compressional stress.

9. The apparatus of claim 1, wherein a plurality of geomechanical testers are coupled to the same extendable arm.

10. The apparatus of claim 1, wherein the geomechanical property tester measures a force used to create the indentation and the force is related to the geomechanical properties of a formation.

11. The apparatus of claim 1, wherein the geomechanical property tester includes a rod with a sharp tip.

12. The apparatus of claim 1, wherein the indentation is one of a circular indentation or a long deformation channel extending along a length of a borehole.

13. The apparatus of claim 12, wherein the long deformation channel is radial or helical in shape.

14. A method comprising:
    disposing a measurement tool within a borehole;
    extending a geomechanical property tester of the measurement tool toward a surface of the borehole, wherein the geomechanical property tester comprises a plurality of transducers on a sharp tip of the geomechanical property tester;
    penetrating the surface of the borehole with the geomechanical property tester; wherein the sharp tip of the geomechanical property tester is configured to be forced into the surface of the borehole to create an indentation; and
    measuring one or more geomechanical properties of the surface of the borehole.

15. The method of claim 14, wherein the measurement tool includes at least one extendable arm coupled to a body of the measurement tool and coupled to the geomechanical property tester, wherein the at least one extendable arm is extendable radially away from the body.

16. The method of claim 15, wherein measuring one or more geomechanical properties of the borehole includes measuring a shape of the borehole using the at least one extendable arm.

17. The method of claim 14, wherein the one or more geomechanical properties of the surface of the borehole includes hardness, compressional, elastic modulus, or shear stress.

18. The method of claim 14, wherein measuring one or more geomechanical properties of the surface of the borehole includes taking measurements along at least one of the axial, circumferential and radial directions of the borehole.

19. The method of claim 14, wherein the one or more geomechanical properties are displayed in a log.

20. The method of claim 14, wherein measuring one or more geomechanical properties of the borehole includes generating a geomechanical property image of the borehole.

21. The method of claim 14, wherein penetrating the surface of the borehole with the geomechanical property tester includes a plurality of individual stationary penetrations along the surface of the borehole by the geomechanical property tester.

22. The method of claim 14, wherein penetrating the surface of the borehole with the geomechanical property tester includes continuous contact between the geomechanical property tester and the surface of the borehole.

23. The method of claim 14, wherein measuring one or more geomechanical properties of the borehole occurs during drilling the borehole.

24. The method of claim 14, wherein measuring one or more geomechanical properties of the borehole occurs after drilling the borehole.

25. The method of claim 14, further comprising retrieving the measurement tool from within the borehole, wherein measuring one or more geomechanical properties of the borehole occurs during the retrieving of the measurement tool from within the borehole.

26. The method of claim 14, wherein disposing a measurement tool within a borehole includes at least one of wireline, logging-while-drilling, and coil tubing modes of deployment.

* * * * *